United States Patent
Honda et al.

[11] Patent Number: 5,596,465
[45] Date of Patent: Jan. 21, 1997

[54] OVERCURRENT PROTECTION CIRCUIT FOR A DC-TO-DC CONVERTER

[75] Inventors: Shigeru Honda; Manabu Sasaki, both of Kawasaki, Japan

[73] Assignee: Fujitsu Limited, Kawasaki, Japan

[21] Appl. No.: 345,759

[22] Filed: Nov. 22, 1994

[30] Foreign Application Priority Data

Mar. 11, 1994 [JP] Japan ................................. 6-041226

[51] Int. Cl.$^6$ ..................................................... H02H 7/00
[52] U.S. Cl. ........................................... 361/18; 323/284
[58] Field of Search ................................ 323/282, 284, 323/901; 361/18, 42, 86, 92, 93, 88

[56] References Cited

U.S. PATENT DOCUMENTS

4,642,746 2/1987 Lösel ........................................ 323/901

Primary Examiner—Jeffrey A. Gaffin
Assistant Examiner—Ronald W. Leja
Attorney, Agent, or Firm—Nikaido, Marmelstein, Murray & Oram LLP

[57] ABSTRACT

The overcurrent protection circuit for a dc-to-dc converter which inputs an input voltage through a power input line, converts the voltage into another voltage to output as an output voltage to a load through a power output line. The overcurrent protection circuit outputs a first connection signal for a predetermined period from the time the input voltage is turned on; detects an overcurrent caused in the load and outputs a second connection signal from the time tile input voltage is turned on until the overcurrent is detected; and closes the power input line while receiving at least one of the first and second connection signals.

15 Claims, 6 Drawing Sheets

OVERCURRENT PROTECTION CIRCUIT FOR A DC-TO-DC CONVERTER

BACKGROUND OF THE INVENTION

1. Field of the Invention

The present invention relates to an overcurrent protection circuit for a dc-to-dc converter.

Such power supply devices as convert one direct-current voltage (hereinafter called an input voltage) into another direct-current voltage (hereinafter called an output voltage), which are called generally as a dc-to-dc converter, are divided broadly into a switching regulator and a series regulator. In order to obtain a required level of output voltage, the switching regulator switches the input voltage on and off by using a transistor, for example; and the series regulator drops the input voltage by using a resistor, for example.

The switching regulator-is divided further into what uses a high-frequency transformer and what directly switches the input voltage. Further, from the standpoint of input voltage-to-output voltage relationship, the switching regulator is classified into a voltage-step-up type and a voltage-step-down type, which convert the input voltage into higher and lower levels of output voltage, respectively.

Of those various types of dc-to-dc converters as mentioned above, it is known that a dc-to-dc converter which directly switches the input voltage on and off (called a ripple-control method) provides the highest conversion efficiency, if limited to a voltage-step-down type. Therefore, the dc-to-dc converter of the ripple control method is most suited for a power supply device for driving a light load, which power supply device requires especially high conversion efficiency.

In the field of information processing and communication, as demand increases for a highly reliable equipment, the same demand is also increasing for a power supply device in recent years. Accordingly, an overcurrent protection circuit for protecting a dc-to-dc converter from an overcurrent due to a short circuit caused in a load, is in great demand.

2. Description of the Related Art

Figure 1A:
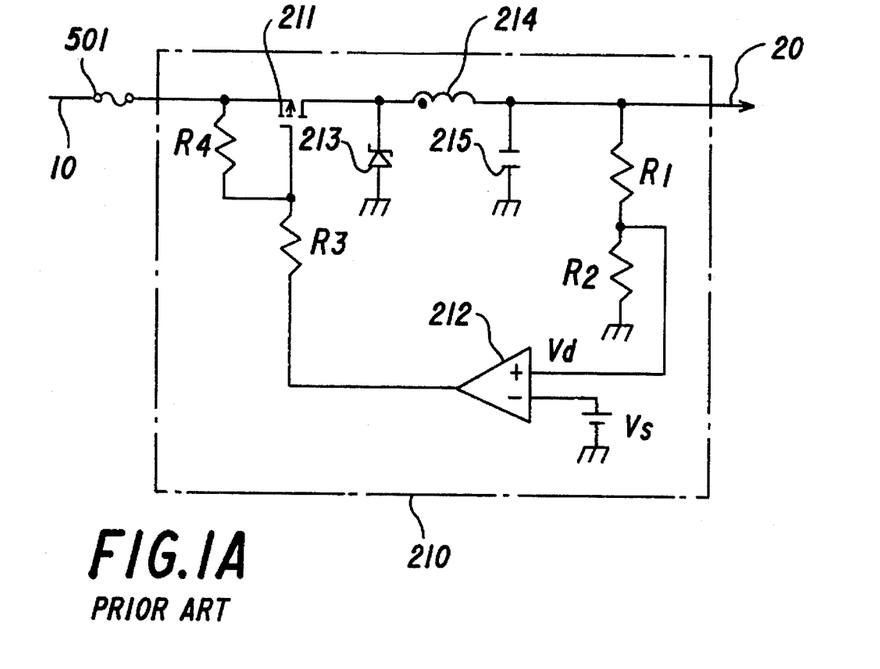
FIGS. 1A–1C are circuit diagrams of prior-art overcurrent protection circuits for voltage-step-down type dc-to-dc converters of the ripple-control type.
Figure 1B:
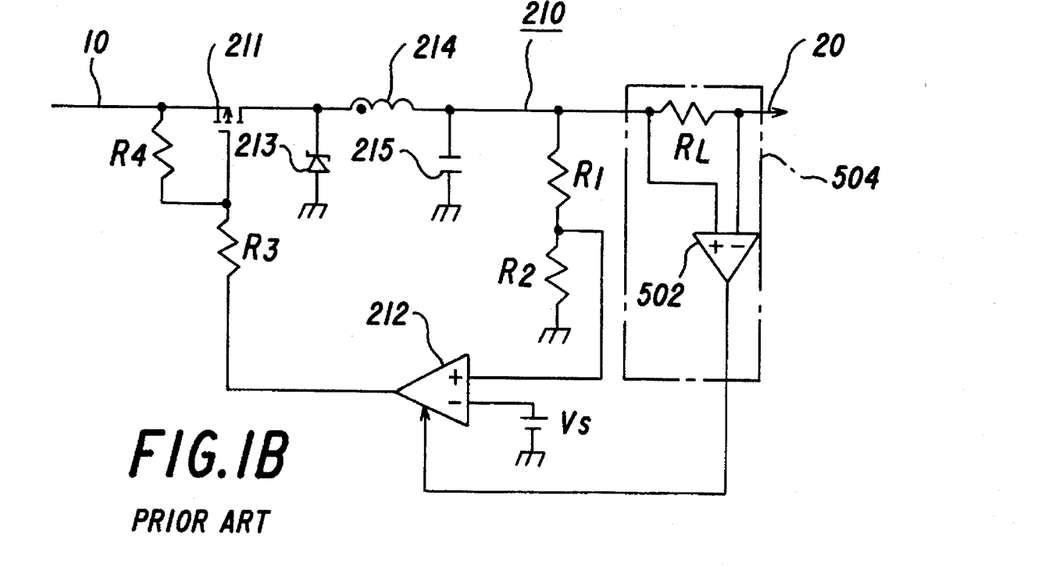
Figure 1C:
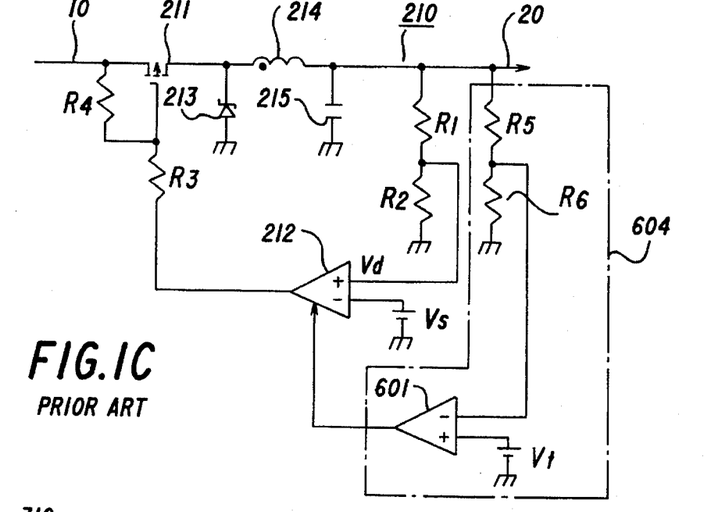

FIGS. 1A–1C are circuit diagrams of prior-art overcurrent protection circuits for voltage-step-down type dc-to-dc converters of the ripple-control type.

In the dc-to-dc converter 210 shown throughout FIGS. 1A–1C, a field effect transistor (hereinafter abbreviated to FET) 211 is turned on and off according to the output of a comparator 212 so as to output a ripple voltage to a smoothing circuit. The smoothing circuit consisting of a zener diode 213, a choke coil 214 and a capacitor 215, smooths (or reduces the ripple of) the ripple voltage to provide a direct-current output voltage.

Resistor pairs R1 and R2 connected in series are grounded in parallel with the capacitor 215. The comparator 212 compares voltage Vd at the junction between the resistors R1 and R2 with reference voltage Vs and outputs a comparison result signal through a resistor R3 to the FET 211 gate, to which the input voltage is applied through a resistor R4. Thus, depending on whether or not the voltage Vd is lower than the reference voltage Vs, the comparator 212 provides the FET 211 gate with a low voltage level corresponding to logical "0" or an open-circuited state, respectively, thereby turning the FET 211 on and off and causing the FET 211 to output a ripple voltage. The ripple voltage is then smoothed by the smoothing circuit to provide stabilized output voltage.

In the dc-to-dc converter 210 which directly switches the input voltage with the FET 211 as explained above, if a load which is connected to the output of the dc-to-dc converter 210 is short-circuited, for example, causing an overcurrent, the overcurrent might flow into the FET 211, eventually damaging the dc-to-dc converter 210. To prevent this, the following method was conventionally used:

As shown in FIG. 1A, the overcurrent protection circuit has a fuse 501 inserted in the power input line 10 (line which supplies the input voltage to the dc-to-dc converter 210). When an overcurrent occurs, and flows through the fuse 501, the fuse 501 fuses and disconnects the power input line 10, thus preventing the overcurrent from flowing into the FET 211.

The overcurrent protection circuit shown in FIG. 1B has a current monitoring circuit 504 inserted in the power output line 20 (line through which the dc-to-dc converter 210 outputs the output voltage). The current monitoring circuit 504 includes a resistor RL and a comparator 502. The comparator 502 compares the voltage Vc across the resistor RL with the predetermined threshold voltage (not shown) and provides the comparison result signal to the comparator 212 so that the comparator 212 causes the FET 211 to turn off when the voltage Vc exceeds the threshold voltage due to a short circuit caused in the load, for example.

The overcurrent protection circuit shown in FIG. 1C has a voltage monitoring circuit 604 connected to the output of the dc-to-dc converter 210. The voltage monitoring circuit 604 includes resistors R5 and R6 and a comparator 601. The comparator 601 compares voltage at the junction between the resistors R5 and R6 with the predetermined reference voltage Vt and provides the comparison result signal the comparator 212 so that the comparator 212 causes the FET 211 to turn off when the former voltage becomes lower than the reference voltage Vt due to a short circuit in the load.

Figure 2A:
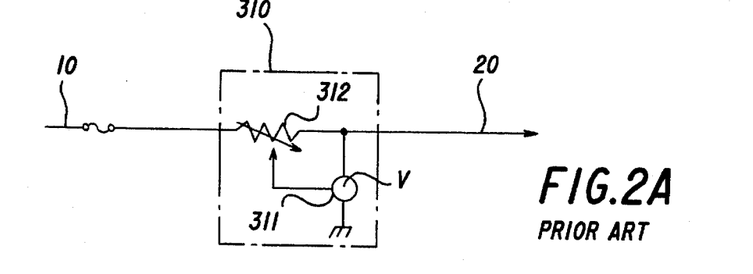
FIG. 2A is a circuit diagram of a prior-art overcurrent protection circuit for a series-regulator type dc-to-dc converter.

FIG. 2A is a circuit diagram of a prior-art overcurrent protection circuit for a series-regulator type dc-to-dc converter.

The series regulator 310 measures the output voltage with a voltage meter 311 and varies the resistance of a variable resistor 312 according to the measured voltage so as to drop the input voltage to a required level of output voltage. The overcurrent protection circuit has a fuse 501 inserted in the power input line 10 of the thus-constructed dc-to-dc converter. The fuse 501 fuses and disconnects the power input line 10 when an overcurrent occurs, thus protecting the series regulator 310 from the overcurrent.

Figure 2B:
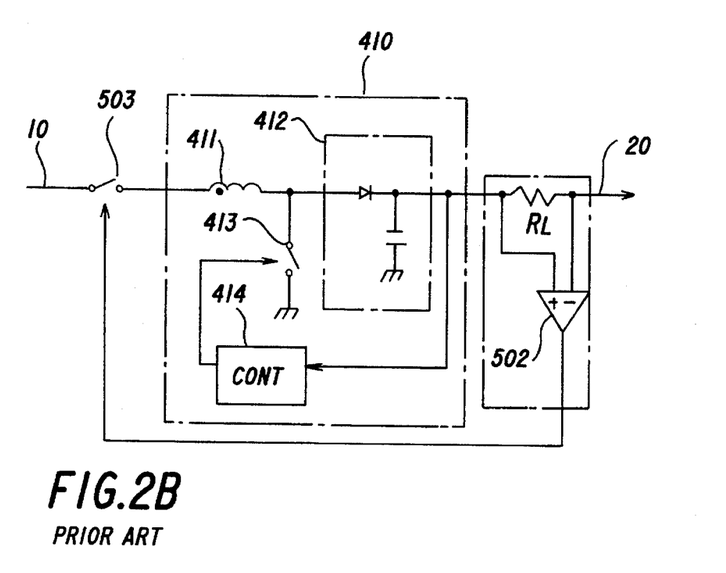
FIG. 2B is a circuit diagram of a prior-art overcurrent protection circuit for a a voltage-step-up chopper type dc-to-dc converter.

FIG. 2B is a circuit diagram of a prior-art overcurrent protection circuit for a a voltage-step-up chopper type dc-to-dc converter.

The dc-to-dc converter 410 of a voltage-step-up chopper type which does not use a high frequency transformer, includes a choke coil 411, a smoothing circuit 412, a control circuit 414 and a switching circuit 503. The control circuit (CONT) 414 is responsive to the output of the smoothing circuit 412 for turning the switching element 413 on and off to provide a required level of output voltage.

As shown in FIG. 2B, the overcurrent protection circuit has a switching circuit 503 and the current monitoring circuit 504 as explained with FIG. 1B, inserted in the power input line 10 and power output line 20, respectively. The comparator 502 detects an output voltage drop resulting from a short circuit caused in the load, in the same way as explained with FIG. 1B and causes the switching circuit 503 to disconnect the power input line 10 so as to protect dc-to-dc converter from an overcurrent due to the short circuit.

However, as for the overcurrent protection circuit using the fuse 501 (see FIGS. 1A and 2A), a problem is that an overcurrent due to a short circuit caused in the load may not be able to fuse the fuse 501, if the dc power supply (not shown in the figures), which supplies the input voltage to the dc-to-dc converter, has a current limitation characteristics. That is, the dc power supply limits a current flowing therefrom to the dc-to-dc converter through the fuse 501, allowing the overcurrent to flow through the dc-to-dc converter, eventually destroying it.

As for the overcurrent protection circuit using the current monitoring circuit 504 for monitoring an output current with the resistor RL (see FIGS. 1B and 2B), it may surely detect a short circuit in the load and protect the dc-to-dc converter from destruction. However, a problem is that voltage drop caused by the resistor RL decreases the voltage conversion efficiency.

As for the overcurrent protection circuit shown in FIG. 1C, it is difficult to discriminate a so-called start-up state from a real load short-circuited state because the output voltage is low in either state. Hereinafter, the start-up state is defined as the state which occurs for the period from the time the input voltage is supplied to the dc-to-dc converter 210 until it starts a normal conversion operation to provide the normal output voltage. The load short-circuited state occurs after the start-up state (or start-up period) when a short circuit occurs in the load, causing a drop in the output voltage. Since the output of the dc-to-dc converter 210 has not yet reached the normal voltage level in the start-up period, a problem is that the comparator 601 will signal the comparator 212 to turn off the FET 211, eventually prohibiting the dc-to-dc converter 210 from performing the normal conversion operation.

SUMMARY OF THE INVENTION

It is therefore an object of the present invention to provide a reliable overcurrent protection circuit which can surely protect the dc-to-dc converter from an overcurrent due to a short circuit caused in a load.

It is another object of the present invention to provide an overcurrent protection circuit which has high conversion efficiency.

It is still another object of the present invention to provide an overcurrent protection circuit which is small-sized and less power-consuming.

To achieve the above and other objects, the present invention provides a timer circuit, an overcurrent detector circuit and a switcher circuit.

In an overcurrent protection circuit for a dc-to-dc converter which inputs an input voltage through a power input line, converts the voltage into another voltage to output as an output voltage to a load through a power output line, the timer circuit outputs a first connection signal for a predetermined period from the time the input voltage is turned on. The overcurrent detector circuit, which is connected to the power output line, detects an overcurrent caused in the load and outputs a second connection signal from the time the input voltage is turned on until the overcurrent is detected. The switcher circuit, which is inserted in the power input line between the timer circuit and the dc-to-dc converter, closes the power input line while at least one of the first and second connection signals is received.

BRIEF DESCRIPTION OF THE DRAWINGS

Throughout the above-mentioned drawings, identical reference numerals are used to designate the same or similar component parts.

DESCRIPTION OF THE PREFERRED EMBODIMENTS

Figure 3:
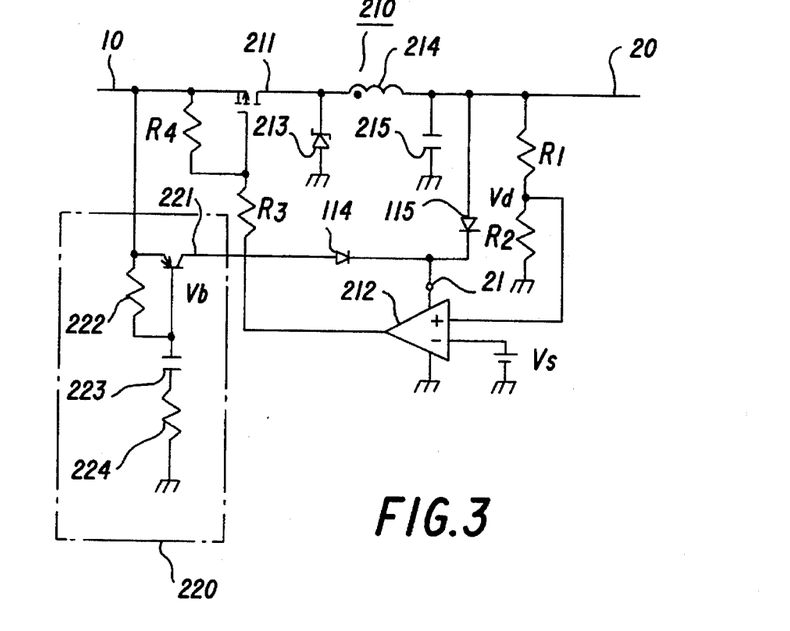
FIG. 3 is a circuit diagram of an overcurrent protection circuit of the present invention for a switching-regulator type dc-to-dc converter.
Figure 4A:
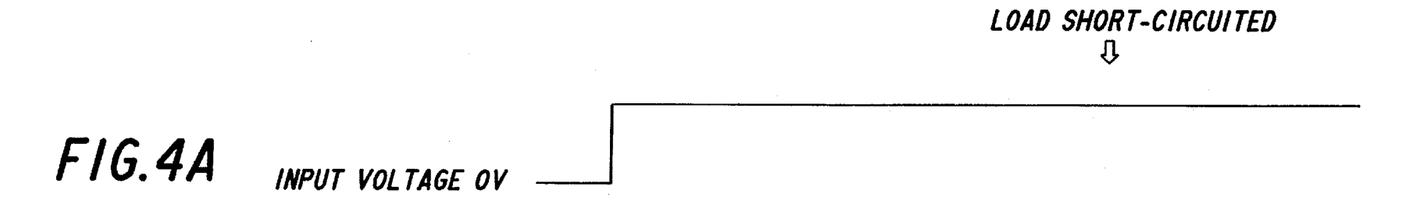
FIG. 4 is a timing chart of the overcurrent protection circuit of the present invention for the switching regulator-type dc-to-dc converter shown in FIG. 3.
Figure 4B:
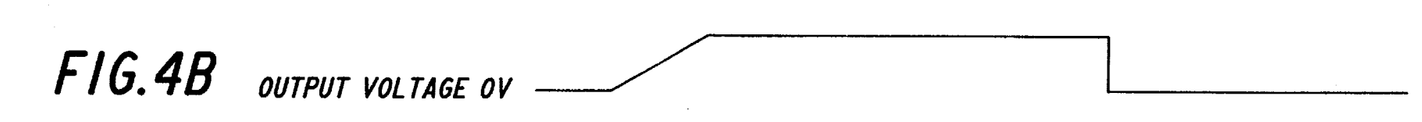
Figure 4C:
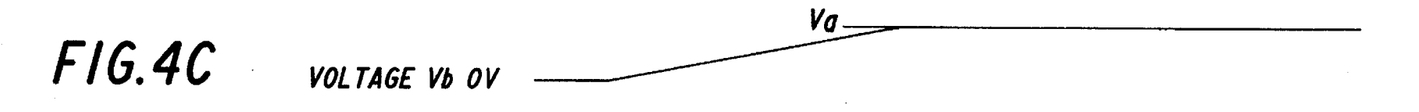
Figure 4D:
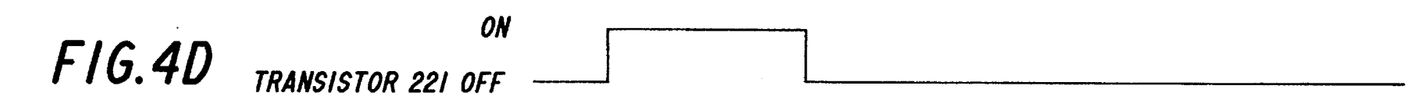
Figure 4E:
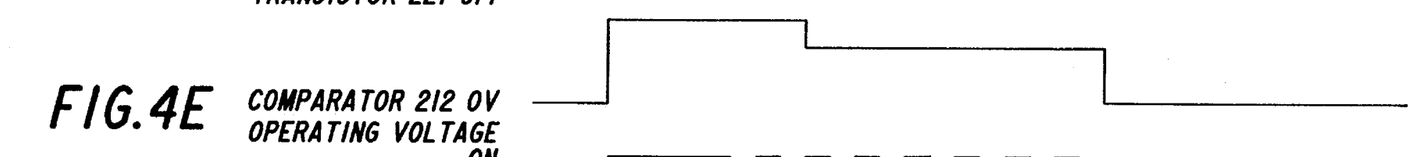
Figure 4F:
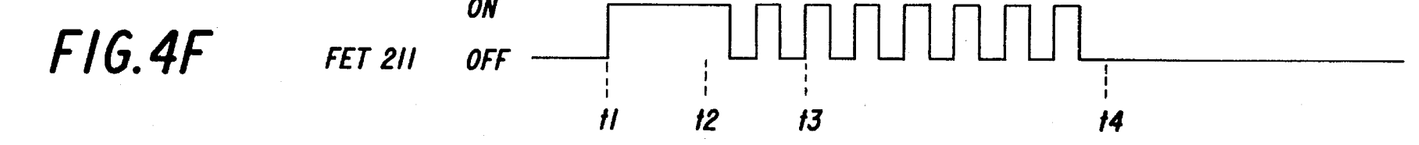

FIG. 3 is a circuit diagram of an overcurrent protection circuit of the present invention for a switching-regulator type dc-to-dc converter.

In the dc-to-dc converter 210, a field effect transistor (hereafter abbreviated to FET) 211 is turned on and off according to the output of a comparator 212 so as to output a ripple voltage to a smoothing circuit. The smoothing circuit consisting of a zener diode 213, a choke coil 214 and a capacitor 215, smooths (i.e., reduces the ripple of) the ripple voltage output from the FET 211 to provide a direct-current output voltage. A pair of resistors R1 and R2 connected in series are inserted between the power output line 20 and the ground. A comparator 212 compares voltage Vd at a junction between the resistors R1 and R2 with reference voltage Vs and outputs a signal representing the comparison result through a resistor R3 to the gate of the FET 211, to which the input voltage is applied through a resistor R4. Thus, depending on whether or not the voltage Vd is lower than the reference voltage Vs, the comparator 212 provides the FET 211 gate with a low voltage level corresponding to logical "0" or an open-circuited state respectively, thereby turning the FET 211 on and off and thus causing the FET 211 to output a ripple voltage. The ripple voltage is then smoothed by the smoothing circuit to provide a stabilized output voltage.

In FIG. 3, an overcurrent protection circuit has a timer circuit 220 and a switchover circuit including two diodes 114 and 115 added to the switching regulator 210. The timer circuit 220 includes a transistor 221, capacitor 223 and resistors 222 and 224. The transistor 221 has the emitter connected to the power input line 10 and the base connected to the ground through the capacitor 223 and resistor 224. The resistor 222 is connected between the emitter and the base of the transistor 221.

When the input voltage is turned on, a current starts flowing from the power input line 10 to the ground through the resistor 222, capacitor 223 and resistor and 224, charging the capacitor 223. Thus, the transistor 221 turns on for the period from the time the input voltage is turned on until the voltage Vb at the capacitor 223 positive terminal, which voltage is applied to the transistor 221 base, reaches a certain level which causes the transistor 221 to turn off and a switchover signal to be output. Hereinafter, the period is called the preliminary period. On receipt of the switchover signal, the switchover circuit switches a path for supplying the operating voltage to the comparator 212, between a first path via the diode 114 and a second path via the diode 115.

The collector of the transistor 221 is connected to a power supply terminal 21 of the comparator 212 through a diode 114. Thus, while the transistor is turned on, i.e., during the preliminary period, the comparator 212 is supplied with an operating voltage through the transistor 221 and the diode 114. Another diode 115 is connected between the power output line 20 and the power supply terminal 21 of the comparator 212 so as to supply the operating voltage thereto. Thus, the operating voltage is supplied to the comparator 212 from the input voltage through the transistor 221 and diode 114 (first path) during the preliminary period and thereafter from the output voltage through the diode 115 (second path).

During the preliminary period in which the output voltage has not risen so high that the voltage Vd is lower than the voltage Vs, the comparator 212 outputs a low level with the operating voltage supplied from the input voltage. Thus, a low voltage is applied to the FET 211 gate and the FET 211 turns on and remains on during the preliminary period to place the dc-to-dc converter 210 in the normal operating state. In the normal operating state, the dc-to-dc converter 210 outputs the required level of output voltage by turning the FET 211 on and off with the comparator 212 supplied with the operating voltage from the output voltage.

Therefore, it can be determined that an output voltage drop occurring after the the preliminary period is due to a short circuit caused in the load. After the preliminary period, when the output voltage drops due to the load short circuit, the comparator 212 outputs an open-circuited state because it fails to receive the operating voltage from the output voltage. As a result, the FET 211 turns off with the gate applied with the input voltage, protecting the dc-to-dc converter 210 from an overcurrent due to the load short circuit.

FIG. 4 is a timing chart of the overcurrent protection circuit of the present invention for the switching regulator-type dc-to-dc converter shown in FIG. 3.

(1) At time t1, when the input voltage is turned on to the dc-to-dc converter, a current starts flowing through the capacitor 223 to the ground, charging the capacitor 223 and raising the voltage Vb at its positive terminal up from the ground level. While the voltage Vb, which is applied to the base of the transistor 221, is comparatively low, the transistor 221 becomes on (conductive) and remains on to supply the input voltage to the power supply terminal 21 of the comparator 212 via the transistor 221 and the diode 114 as the operating voltage. While the output voltage has not yet risen so high that the voltage Vd is lower than the reference voltage Vs, the comparator 212 outputs a low voltage corresponding to logical "0" to the FET 211 gate. Then, the FET 211 is turned on and kept turned on to supply the input voltage to the smoothing circuit.

(2) At time t2, when the output voltage has risen high enough and the voltage Vd becomes higher than the reference voltage Vs, the comparator 212 outputs an open-circuited state, which causes the input voltage to be applied to the FET 211 gate and thus causes the FET 211 to turn off. Then, the smoothing circuit is cut off from the input voltage, eventually dropping the output voltage. As a result, the voltage Vd becomes lower than the reference voltage Vs and the comparator 212 outputs a low voltage level, which causes the FET 211 to turn on again and supply the input voltage to the smoothing circuit. Thereafter, the above operation is repeated to turn the FET 211 on and off to allow the smoothing circuit to provide the normal (i.e., the required level of) output voltage. Thus, the dc-to-dc converter 210 is placed in the normal operating state.

(3) At time t3, when the voltage Vb at the positive terminal of the capacitor 223 reaches a voltage Va which causes the transistor 221 to turn off, the comparator 212 is cut off from the operating voltage of the input voltage. However, the comparator 212 is already being supplied with the operating voltage from the normal output voltage through the diode 115 since the time t1, therefore keeping the FET 211 turned on and the dc-to-dc converter in the normal operating state.

(4) At time t4, when a short circuit occurs in the load, the output voltage drops and the voltage Vd becomes lower than the reference voltage Vs. Then, the comparator 212 outputs an open-circuited state, which causes the FET 211 gate to be supplied with the input voltage and the FET 211 to turn off. Thus, the dc-to-dc converter 210 and also the load are disconnected from the input power supply and accordingly protected from an overcurrent due to the short circuit.

Figure 5:
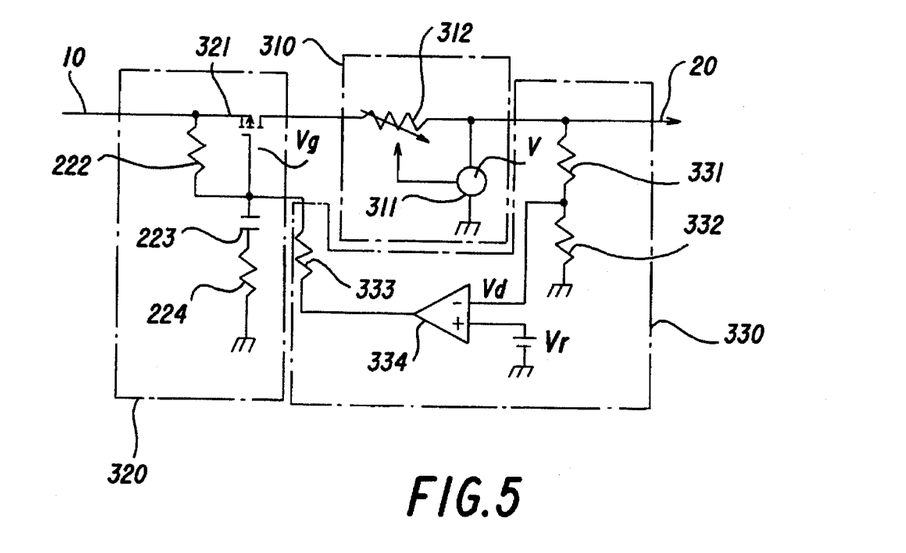
FIG. 5 is a circuit diagram of an overcurrent protection circuit of the present invention for a series-regulator type dc-to-dc converter.
Figures 6A, 6B:
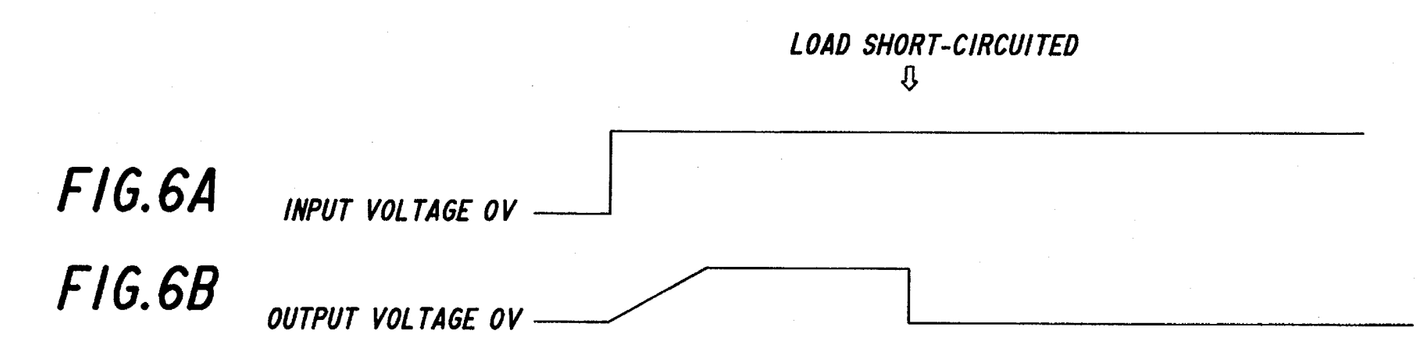
FIG. 6 is a timing chart of the overcurrent protection circuit for the series-regulator type dc-to-dc converter shown in FIG. 5.
Figure 6C:
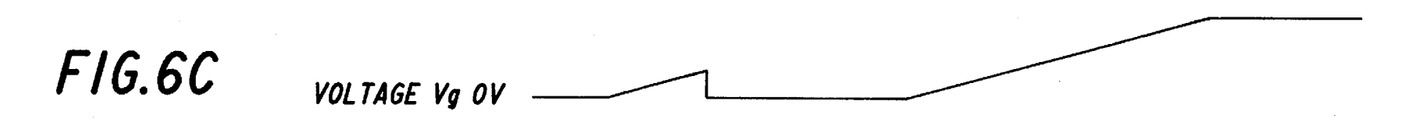
Figure 6D:
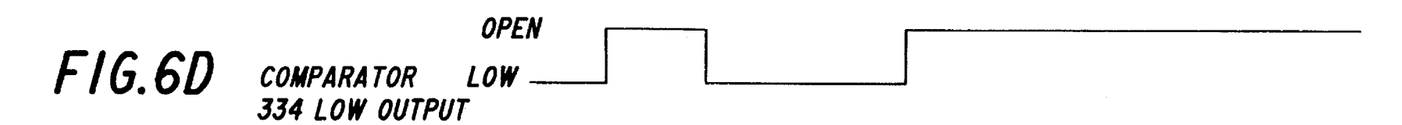
Figure 6E:
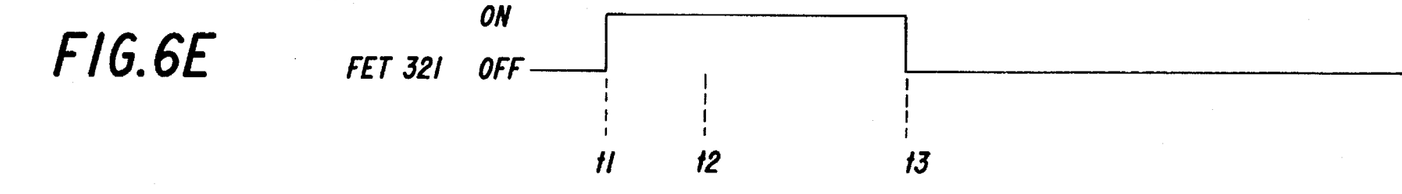

FIG. 5 is a circuit diagram of an overcurrent protection circuit of the present invention for a series-regulator type dc-to-dc converter.

A dc-to-dc converter 310 measures the output voltage with a voltage meter 311 and varies the resistance of a variable resistor 312 according to the measured voltage to drop the input voltage to the required level of output voltage.

As shown in FIG. 5, the overcurrent protection circuit for the series regulator 310 is comprised of a switching circuit 320 and a voltage monitoring circuit 330. The input voltage is supplied to the dc-to-dc converter 310 via the switching circuit 320. The voltage monitoring circuit 330 consisting of resistors 331–333 and a comparator 334, is connected to the power output line 20 of the dc-to-dc converter 310. The resistors 331 and 332 connected in series are inserted between the power output line 20 and the ground. The comparator 502 compares voltage Vd at the junction between the resistors 331 and 332 with predetermined reference voltage Vr and, depending on the comparison result, controls the switching circuit 320 so as to switch on and off the power input line 10.

The switching circuit 320 consisting of resistors 222 and 224, a capacitor 223 and an FET 321, is inserted in the power input line 10 of the dc-to-dc converter 310. The FET 321 has the source supplied with the input voltage, the drain connected to the input of the series regulator 310 and the gate grounded through the capacitor 223 and resistor 224. The output of the comparator 334 is connected to the FET 321 gate via the resistor 333. The voltage Vd at the junction between the resistors 331 and 332 is input to the "−" terminal of the comparator 334 and reference voltage Vr is input to the "+" terminal. Thus, depending on whether or not the voltage at the junction is higher than the reference voltage Vr, the comparator 212 provides a low voltage level corresponding to logical "0" or an open-circuited state respectively to turn the FET 321 on and off.

In the switching circuit 320, when the input voltage is turned on, a current starts flowing from the power input line 10 to the ground through the resistor 222, capacitor 223 and resistor and 224, charging the capacitor 223 and raising the voltage Vg at the gate of the FET 321 up from the ground level. The FET 321 turns on when the input voltage is turned on and remains turned on while the voltage Vg is below a certain level, allowing the series regulator 310 to convert the input voltage into the normal output voltage. If the voltage Vg to continues to go high as the capacitor 223 is charged, the FET 321 will be turned off halfway. Actually, the voltage Vg remains low and the FET 321 remains turned on because the comparator 333 outputs a low voltage level with the normal output voltage input to its "−" terminal from the dc-to-dc converter 310. When the dc-to-dc converter 310 comes to provide the normal output voltage and the voltage Vd becomes higher than the reference voltage Vr and therefore, the comparator 333 outputs a low voltage level to keep the voltage Vg low and to keep the FET 321 turned on. Thus, the dc-to-dc converter 310 continues to provide the normal output voltage.

In ease the output voltage of the dc-to-dc converter 310 drops due to a short circuit caused in the load, for example and the voltage Vd goes lower than the reference voltage Vr, the comparator 333 outputs an open-circuited state, which causes the input voltage to be applied to the FET 321 gate and the FET 321 to be turned off. Accordingly, the dc-to-dc converter 310 is cut off from the input voltage and protected from an overcurrent due to the short circuit.

FIG. 6 is a timing chart of the overcurrent protection circuit for the series-regulator type dc-to-dc converter shown in FIG. 5.

(1) At time t1, when the input power supply is turned on, a current starts flowing through the capacitor 223 to the ground, charging the capacitor 223 and raising the voltage Vg at FET 321 gate up from the ground level. While the voltage Vg is low, the FET 321 is turned on (conductive), supplying the input voltage to the dc-to-dc converter 310 and the output voltage starts rising. While the output voltage is not so high that the voltage Vd is lower than the reference voltage Vr, the comparator 334 outputs an open-circuited state to keep the FET 211 turned on.

(2) At time t2, when the output voltage has risen to the normal level and the voltage Vd becomes higher than the reference voltage Vr, the comparator 334 outputs a low voltage level corresponding to logical "0", which causes the voltage Vg to go low and the FET 211 to remain turned on.

(3) At time t3, when a short circuit occurs in the load, the output voltage drops and the voltage Vd becomes lower than the reference voltage Vr. Then, the comparator 334 outputs an open-circuited state, which causes the voltage Vg to go high and the FET 321 to turn off. Thus, the dc-to-dc converter 310 is cut off from the input voltage to protect the dc-to-dc converter 310 itself and also the load from an overcurrent due to the short circuit.

Since the FET 321 switches on and off the input voltage depending on the voltage level provided by the capacitor 223 and the comparator 334, the overcurrent protection circuit can surely place the dc-to-dc converter 310 in the normal operating state and correctly detect a short circuit caused in the load. Accordingly, it can safely protect the dc-to-dc converter 410 and also the load from an overcurrent due to the short circuit.

Figure 7:
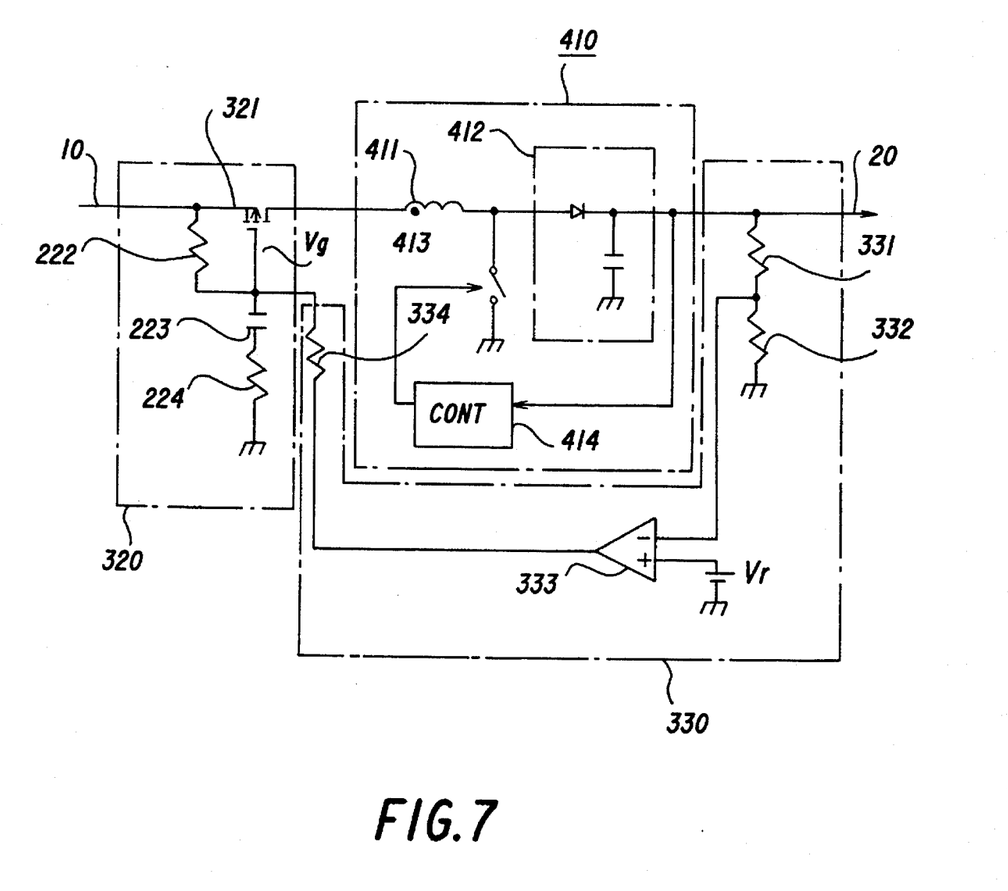
FIG. 7 is a circuit diagram of an overcurrent protection circuit of the present invention for a voltage-step-up-chopper type dc-to-dc converter.

FIG. 7 is a circuit diagram of an overcurrent protection circuit of the present invention for a voltage-step-up-chopper type dc-to-dc converter.

The dc-to-dc converter 410 of a voltage-step-up chopper type which does not use a high frequency transformer, includes a choke coil 411, a smoothing circuit 412, a control circuit 414 and a switching circuit 503. The control circuit (CONT) 414 is responsive to the output of the smoothing circuit 412 for turning the switching element 413 on and off to provide a required level of output voltage.

The overcurrent protection circuit has the switching circuit 320 and the voltage monitoring circuit 330 as shown in FIG. 5, added to the dc-to-dc converter 410. The overcurrent protection circuit for the voltage-step-up-chopper type dc-to-dc converter operates in the same way as that for the series-regulator (see FIG. 6—timing chart).

The present invention can be applied to various types of dc-to-dc converters by varying the capacitance of the capacitor 223 according to the start-up period required for respective dc-to-dc converter. Also, the switch circuit 220 can be realized by using other circuits including a timer circuits and counter.

As explained above, the present invention can provide a reliable overcurrent protection circuit, which can safely protect the dc-to-dc converter and also the load from an overcurrent due to a short circuit caused in a load by surely placing the dc-to-dc converter in the normal operating state and correctly detecting the short circuit. Further, the present invention can provide a small-sized and conversion-efficient overcurrent protection circuit by constructing the circuit with small amount of simple and less power-consuming circuitry.

What is claimed is:

1. An overcurrent protection circuit for a dc-to-dc converter which converts a voltage which has been input onto a power input line into another voltage to output as an output voltage to a load through a power output line, said overcurrent protection circuit comprising:

a timer circuit connected to the power input line for outputting a first connection signal for a predetermined period from the time the input voltage is turned on;

an overcurrent detector circuit, connected to the power output line, for detecting an overcurrent caused in the load and for outputting a second connection signal from the time the input voltage is turned on until the overcurrent is detected; and a switcher circuit, inserted in the power input line between said timer circuit and the dc-to-dc converter, for closing the power input line while receiving at least one of the first and second connection signals.

2. An overcurrent protection circuit according to claim 1, wherein said timer circuit comprises a capacitor and a resistor connected in series between the power input line and the ground; and wherein the predetermined period is determined by the time when the capacitor is charged to a given voltage.

3. An overcurrent protection circuit according to claim 1, wherein said overcurrent detector circuit detects the overcurrent when the output voltage drops to a predetermined voltage.

4. An overcurrent protection circuit according to claim 3, wherein said overcurrent detector circuit comprises a comparator for comparing the output voltage with the predetermined voltage, and wherein said overcurrent detector circuit detects the overcurrent when said comparator detects that the output voltage is lower than the predetermined voltage.

5. An overcurrent protection circuit for a dc-to-dc converter which converts a voltage which has been input onto a power input line into another voltage to output as an output voltage to a load through a power output line, said overcurrent protection circuit comprising:

a timer circuit which includes at least a capacitor and a resistor connected in series between the power input line and ground, for outputting a logic high for a predetermined period after the input voltage is turned on;

a voltage divider resistor connected between the power output line and the ground for dividing the output voltage;

a comparator having an output connected to an output of said timer circuit for comparing the voltage divided by said voltage divider resistor with a reference voltage and for outputting a logic low when the voltage divided is higher than the reference voltage and otherwise, outputting an open-circuited state; and a switcher circuit, inserted in the power input line between said timer circuit and the dc-to-dc converter, for switching on and off the power input line in response to the output of said comparator.

6. An overcurrent protection circuit for a dc-to-dc converter which includes a switching circuit for switching on and off a power input line supplying an input voltage to the dc-to-dc converter, smoothing circuit for smoothing an output of the switching circuit to output as an output voltage to a load through a power output line, and a control circuit having a power supply terminal receiving an operating voltage for controlling the switching circuit according to the output voltage, said overcurrent protection circuit comprising:

a timer circuit for outputting a switchover signal a predetermined period after the input voltage is turned on; and a switchover circuit, connected to the power input line, the power output line, and the power supply terminal for changing a connection with the terminal from the power input line to the power output line when receiving the switchover signal from said timer circuit.

7. An overcurrent protection circuit according to claim 6, wherein said timer circuit comprises a capacitor and a resistor connected in series between the power input line and the ground; and wherein the predetermined period is determined by the time when said capacitor is charged to a given voltage level.

8. An overcurrent protection circuit according to claim 6, wherein said switchover circuit comprises:

a switching element and a first diode connected in series between the power input line and the power supply terminal of the switching circuit, said switching element turning off when receiving the switchover signal from said timer circuit and said first diode being connected in a forward direction with respect to the input voltage; and a second diode connected between the power output line and the power supply terminal of the switching circuit in a forward direction with respect to the output voltage.

9. An overcurrent protection circuit for a dc-to-dc converter which includes a switching circuit for switching on and off a power input line supplying an input voltage to the dc-to-dc converter, smoothing circuit for smoothing an output of the switching circuit to output as an output voltage to a load through a power output line, and a control circuit having a power supply terminal receiving an operating voltage for controlling the switching circuit so as to switch on and off according to the output voltage with the operating voltage supplied to the power supply terminal thereof and to switch off without the operating voltage supplied, said overcurrent protection circuit comprising:

a timer circuit which includes a capacitor and a resistor connected in series between the power input line and the ground;

a switching element and a first diode, connected in series between the power input line and the power supply terminal of the control circuit with an on/off control terminal of said switching element connected to a positive terminal of said capacitor, for supplying the input voltage to the power supply terminal of the control circuit in response to a voltage at the positive terminal of said capacitor; and a second diode, connected between the power output line and the power supply terminal of the control circuit, for supplying the output voltage to the power supply terminal of the control circuit.

10. A method of protecting a dc-to-dc converter from an overcurrent, which dc-to-dc converter converts a voltage which has been input onto a power input line into another voltage to output as an output voltage to a load through a power output line, said method comprising the steps of:

(a) outputting a first connection signal for a predetermined period from the time the input voltage is turned on;

(b) detecting an overcurrent caused in the load and outputting a second connection signal from the time the input voltage is turned on until the overcurrent is detected; and (c) closing the power input line while receiving at least one of the first and second connection signals.

11. A method of protecting a dc-to-dc converter from an overcurrent, which dc-to-dc converter converts voltage which has been input onto a power input line into another voltage to output as an output voltage to a load through a power output line, said method comprising the steps of:

(a) providing a timer circuit which includes at least a capacitor and a resistor connected in series between the power input line and the ground;

(b) dividing the output voltage;

(c) providing a comparator for comparing the voltage divided in step (b) with a reference voltage;

(d) outputting a low voltage corresponding to logical 0 when the voltage divided is higher than the reference voltage and otherwise, outputting an open-circuited state; and (e) wiring an output of the timer circuit to that of the comparator, (f) switching on and off the power input line in response to a voltage at the wiring.

12. A method of protecting a dc-to-dc converter from an overcurrent, which dc-to-dc converter includes a switching circuit for switching on and off an input voltage input through a power input line, smoothing circuit for smoothing an output of the switching circuit to output as an output voltage to a load through a power output line, and a control circuit for controlling the switching circuit according to the output voltage, said method comprising the steps of:

(a) outputting a switchover signal a predetermined period after the input voltage is turned on;

(b) connecting a switchover circuit to the power input line and power output line; and (c) switching an operating voltage to be supplied to a power supply terminal of the switching circuit from the input voltage to the output voltage when the switchover signal is output.

13. A method of protecting a dc-to-dc converter from an overcurrent, which dc-to-dc converter includes a switching circuit for switching an input voltage input through a power input line, smoothing circuit for smoothing an output of the switching circuit to output as an output voltage to a load through a power output line, and a control circuit for controlling the switching circuit to perform the switching operation according to the output voltage with a operating voltage supplied to a power supply terminal thereof and to switch off the input voltage without the operating voltage supplied, said method comprising the steps of:

(a) providing a timer circuit which includes a capacitor and a resistor connected in series between the power input line and the ground;

(b) connecting a switching element and a first diode in series between the power input line and the power supply terminal of the control circuit with an on/off control terminal of the switching element connected to a positive terminal of the capacitor so that the input voltage is supplied to the power supply terminal of the control circuit in response to a voltage at the positive terminal of the capacitor; and (c) connecting a second diode between the power output line and the power supply terminal of the control circuit so that the output voltage is supplied to the power supply terminal of the control circuit.

14. An overcurrent protection circuit for a dc-to-dc converter which includes a switching circuit for switching on and off a power input line supplying an input voltage to the dc-to-dc converter, smoothing circuit for smoothing an output of the switching circuit to output as an output voltage to a load through a power output line, and a control circuit for controlling the switching circuit so as to switch on and off according to the output voltage when at least one of the first and second enable signals is input thereto and otherwise, to switch off, said overcurrent protection circuit comprising:

a timer circuit connected the power input line, for outputting the first enable signal for a predetermined period from a time the input voltage is turned on; and an overcurrent detector circuit connected to the power output line, for detecting an overcurrent caused in the load and for outputting the second enable signal from the time the input voltage is turned on until the overcurrent is detected.

15. An overcurrent protection circuit according to claim 14, wherein said timer circuit comprises a combination of a capacitor and a resistor connected in series between the power input line and the ground;

a switching element having first, second and third terminals, the first terminal connected to the power input line, the second terminal connected to said combination of the capacitor and resistor so that the first and third terminals close for the predetermined period determined by a time when the capacitor is charged to a given voltage; and a first diode connected between the third terminal of said switching element and the control circuit, for outputting a voltage from the power input line to the control circuit as the first enable signal, and wherein said overcurrent detector circuit comprises a second diode connected between the power output line and the control circuit, for outputting a voltage from the power output line to the control circuit as the second enable signal.

* * * * *